United States Patent
Ring

(10) Patent No.: US 12,145,529 B1
(45) Date of Patent: Nov. 19, 2024

(54) SAFETY HARNESS DEVICE FOR A VEHICLE OCCUPANT

(71) Applicant: Iulia Carmen Ring, Middletown, NY (US)

(72) Inventor: Iulia Carmen Ring, Middletown, NY (US)

( * ) Notice: Subject to any disclaimer, the term of this patent is extended or adjusted under 35 U.S.C. 154(b) by 0 days.

(21) Appl. No.: 18/207,646

(22) Filed: Jun. 8, 2023

Related U.S. Application Data

(60) Provisional application No. 63/358,246, filed on Jul. 5, 2022.

(51) Int. Cl.
| | |
|---|---|
| B60R 22/00 | (2006.01) |
| B60R 22/10 | (2006.01) |
| B60R 22/18 | (2006.01) |

(52) U.S. Cl.
CPC .......... B60R 22/001 (2013.01); B60R 22/105 (2013.01); B60R 22/18 (2013.01)

(58) Field of Classification Search
CPC ...... B60R 22/001; B60R 22/105; B60R 22/18
See application file for complete search history.

(56) References Cited

U.S. PATENT DOCUMENTS

| | | | |
|---|---|---|---|
| 2,888,063 | A | 5/1959 | Rose |
| 3,028,200 | A | 4/1962 | Dye |
| 3,380,776 | A | 4/1968 | Dillender |
| 3,529,864 | A | 9/1970 | Rose et al. |
| 3,888,509 | A | 6/1975 | Willey |
| 4,143,914 | A * | 3/1979 | Klich .................... B60R 22/105 |
| | | | 297/465 |
| 6,871,360 | B1 * | 3/2005 | Ashline ................. A42B 3/0473 |
| | | | 2/468 |
| 10,315,615 | B2 | 6/2019 | Rivera |
| 10,668,890 | B2 | 6/2020 | Rock |
| 11,014,526 | B1 * | 5/2021 | Morgan ................ B60R 22/105 |
| 2001/0008337 | A1 * | 7/2001 | Ganesan ................ B60R 22/02 |
| | | | 280/801.1 |
| 2003/0173817 | A1 * | 9/2003 | Vits ....................... B60N 2/2812 |
| | | | 297/484 |
| 2015/0069812 | A1 * | 3/2015 | Kim ....................... B60R 22/14 |
| | | | 297/465 |
| 2018/0009408 | A1 | 1/2018 | Brodie et al. |
| 2019/0315307 | A1 * | 10/2019 | Macaluso ............. B60R 22/105 |

FOREIGN PATENT DOCUMENTS

| | | | | |
|---|---|---|---|---|
| CN | 104627039 A | * | 5/2015 | |
| FR | 2679503 A1 | | 1/1993 | |
| FR | 2847217 A1 | * | 5/2004 | ........... B60R 22/105 |
| WO | WO-9947028 A1 | * | 9/1999 | ........... A47D 15/008 |

OTHER PUBLICATIONS

Translation of FR-2847217-A1 (Year: 2004).*
Translation of CN-104627039-A (Year: 2015).*

* cited by examiner

*Primary Examiner* — Jason D Shanske
*Assistant Examiner* — Scott Lawrence Strickler
(74) *Attorney, Agent, or Firm* — John Rizvi; John Rizvi, P.A.—The Patent Professor®

(57) ABSTRACT

A safety harness device for securing a vehicle occupant within a vehicle is described. The safety harness device comprises a plurality of interconnected straps configured to be worn by the vehicle occupant. The safety harness device further comprises at least one fastener configured to be detachably coupled to an attachment means of the vehicle, thereby securing the safety harness device, and the vehicle occupant wearing the safety harness device, within the vehicle.

8 Claims, 4 Drawing Sheets

SAFETY HARNESS DEVICE FOR A VEHICLE OCCUPANT

CROSS-REFERENCE TO RELATED APPLICATIONS

This application claims the benefit of U.S. Provisional Patent Application Ser. No. 63/358,246 filed on Jul. 5, 2022, which is incorporated by reference herein it is entirety.

FIELD OF THE INVENTION

The present invention relates generally to safety harnesses, and more particularly to a safety harness device for securing a vehicle occupant within a vehicle in a comfortable position.

BACKGROUND OF THE INVENTION

Generally, passengers travelling in a vehicle have to sit on a seat, such as a back seat, of the vehicle. The vehicle is generally equipped with seat belts to secure the passengers within the vehicle. Though seat belts are provided in almost all vehicles, the seat belts restrict the freedom of movement of the passengers. This is especially true for children and adults having medically uncomfortable conditions. For instance, adults having medical conditions related to their back or spine may not be able to sit for long periods of time. Also, children find it inconvenient to sit still with the minimal movement that occurs with the restrictions of seat belts.

Studies have shown that passengers sitting in a vehicle often suffer from whiplash in cases of accidents that involve sudden stops. As per one study, whiplash often occurs in low velocity rear-end vehicle collisions. In the United States, 90% of injuries in rear-end crashes are neck injuries (Romilly s D), Skipper C S. *Seat structural design choices and the effect on occupant injury potential in rear end collisions. SAE Transactions,* 2005). As per another study of traffic accident data compiled in Germany, over 90% of whiplash injuries result from rear impacts at speeds of less than 25 km/h (Watanabe Y, Ichikawa H, Kayama O, et al. *Influence of seat characteristics on occupant motion in low-speed rear impacts Accident Anal Prev* 2000). Accordingly, in conventional securing systems provided in vehicles, there is a high risk of whiplash even in low velocity accidents.

Accordingly, there is an established need for a solution to the problems mentioned above. For instance, there is an established need for a device that allows a vehicle occupant to be safely secured within the vehicle. Further, there is an established need for a device that allows a vehicle occupant to travel in a comfortable position and have freedom of movement. Further, there is an established need for a device that reduces the risk of whiplash in case of accidents.

SUMMARY OF THE INVENTION

The present invention relates to a safety harness device for securing a vehicle occupant within a vehicle. The safety harness device comprises a plurality of straps configured to be worn by the vehicle occupant. The safety harness device further comprises at least one fastener configured to be detachably coupled to an attachment means of the vehicle, thereby securing the safety harness device, and the vehicle occupant wearing the safety harness device, within the vehicle.

In an aspect, the plurality of straps comprises one or more torso straps configured to be worn around a torso of the vehicle occupant.

In an aspect, the one or more torso straps define a first accommodating space configured to receive the torso of the vehicle occupant.

In an aspect, the plurality of straps comprises one or more thigh straps configured to be worn around a thigh portion of the vehicle occupant.

In an aspect, the one or more thigh straps define a second accommodating space configured to receive the thigh portion of the vehicle occupant.

In an aspect, the safety harness device comprises first adjusting means to adjust the first accommodating space, and second adjusting means for adjusting the second accommodating space.

In an aspect, the safety harness device comprises a buckle at the one or more torso straps for securely wrapping around a torso of the vehicle occupant.

In an aspect, the safety harness device comprises a height adjusting mechanism for adjusting a height of the safety harness device.

In an aspect, the present invention is directed to a system for securing a vehicle occupant, the system comprising a safety securing harness and attachment means provided within the vehicle. In an aspect, the attachment means comprises a seat belt buckle. In an aspect, the attachment means is comprised of a child seat anchor.

These and other objects, features, and advantages of the present invention will become more readily apparent from the attached drawings and the detailed description of the embodiments and examples, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
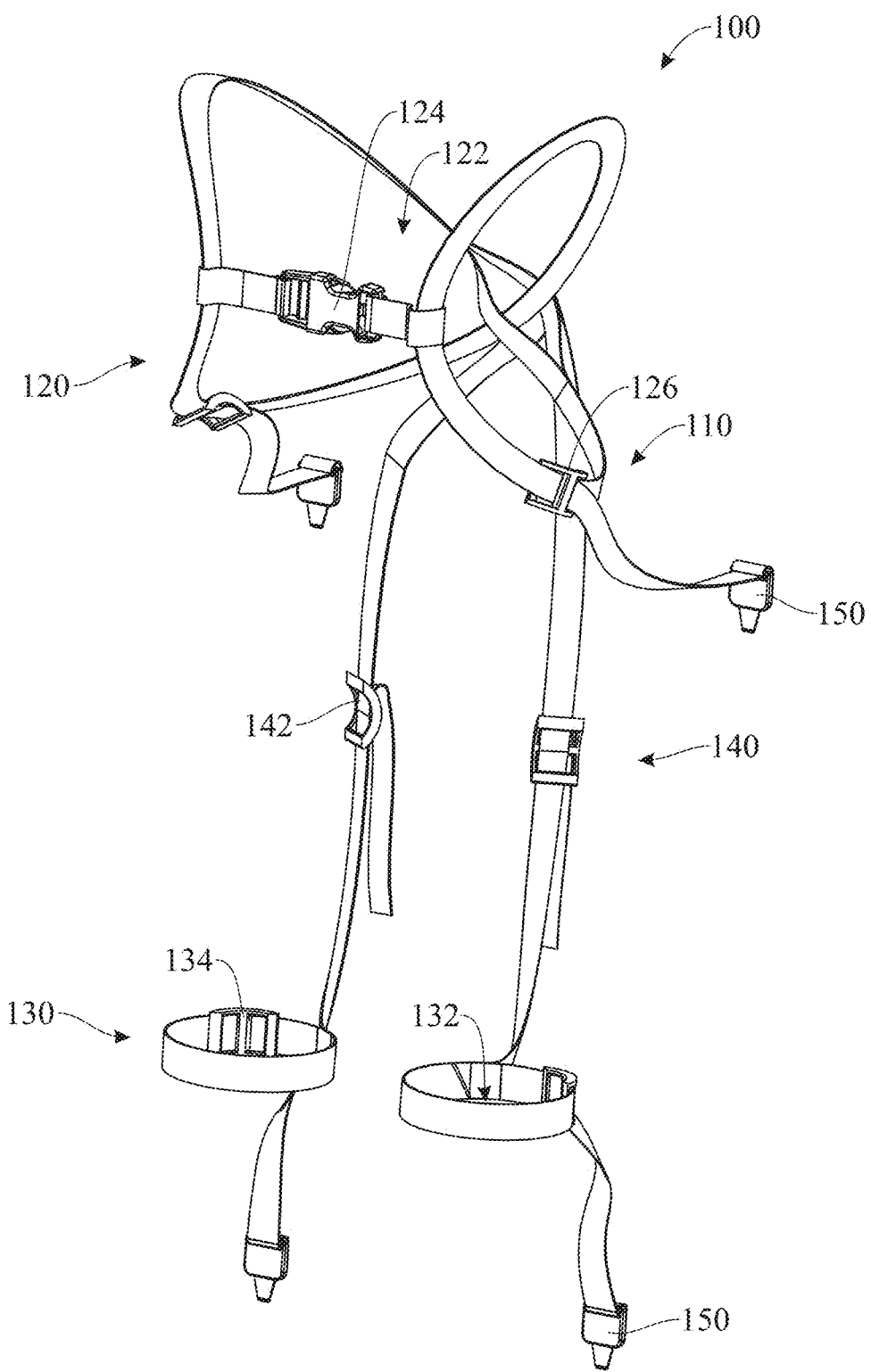
FIG. 1 illustrates a perspective view of a safety harness device, in accordance with one embodiment of the present specification.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other embodiments. All of the embodiments described below are exemplary embodiments provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, well-known elements associated with safety harness have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

As used in this specification and the appended claims, the singular forms "a," "an," and "the" include plural referents unless the content clearly dictates otherwise, and the vice versa. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

It should be noted that throughout the specification and claims which follow, the term "vehicle" refers to any type of movable vehicle such as a car, jeep, van, SUVs, convertibles, mini bus, or the like.

Figure 2:
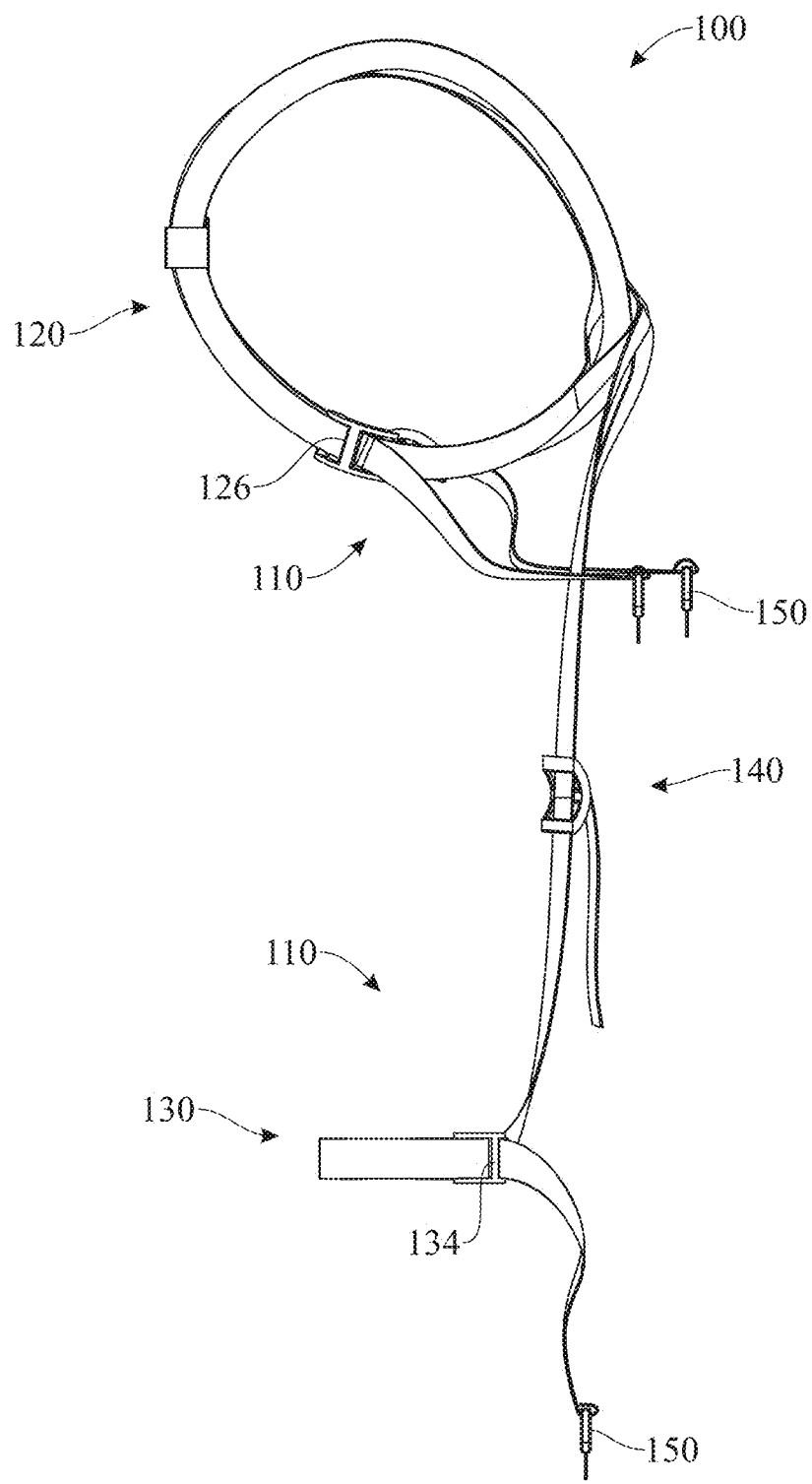
FIG. 2 illustrates a side view of the safety harness device of FIG. 1, in accordance with one embodiment of the present specification.

Reference is initially made to FIGS. 1-2 that illustrates a safety harness device 100. FIG. 1 illustrates a perspective view of the safety harness device 100 while FIG. 2 illustrates a side view of the safety harness device 100. The safety harness device 100 is configured to be detachably coupled to a vehicle, in particular, to securing means provided within the vehicle, such as on a back seat of the vehicle. The safety harness device 100 is further configured to be worn by a vehicle occupant, thereby enabling the vehicle occupant to be secured within the vehicle. The vehicle occupant may be a child, a teenager, an adult, a person with disability, a person in discomfort, or the like.

The safety harness device 100 comprises a plurality of interconnected straps 110 which enable a vehicle occupant to wear the safety harness device 100 around the body of the vehicle occupant. In some embodiments, the safety harness device 100 is mainly worn around a torso of the vehicle occupant. In some embodiments, the safety harness device 100 is mainly worn around one or both thigh portions of vehicle occupant. In some embodiments, the safety harness device 100 is worn around both the torso and one or both thigh portions of the vehicle occupant.

In some embodiments, the plurality of interconnected straps 110 are formed of a durable and sturdy material. In some embodiments, the plurality of interconnected straps 110 are formed of a fabric material. In some embodiments, the plurality of interconnected straps 110 are formed of material comprising polyester or polyamide.

In some embodiments, the plurality of interconnected straps 110 may comprise one or more torso straps 120 and one or more thigh straps 130. The one or more torso straps 120 are configured to be wrapped around and accommodate a torso of a vehicle occupant. The one or more thigh straps 130 are configured to be wrapped around and accommodate thigh areas of a vehicle occupant. In some embodiments, the safety harness device 100 is a 5-point harness device that complies with local state laws.

In some embodiments, the one or more torso straps 120 are wrapped around a shoulder portion, a chest portion, and a back portion of a vehicle occupant, the one or more torso straps defining a first accommodating space 122 configured to receive a torso of a vehicle occupant. By virtue of the first accommodating space 122, the one or more torso straps 120 wrap around the vehicle occupant.

In some embodiments, the one or more torso straps 120 comprise a buckle 124 adjacent a chest portion of a vehicle occupant and configured to secure the one or more torso straps 120 around the torso of the vehicle occupant. In particular, the one or more torso straps 120 may fasten around the torso of a vehicle occupant by means of the buckle 124 to secure the safety harness device 100 on the vehicle occupant.

In some embodiments, the first accommodating space 122 is adjustable so as to accommodate vehicle occupants of different body shapes and sizes. The one or more torso straps 120 may comprise first adjusting means 126 configured to adjust the first accommodating space 122. In some embodiments, the first adjusting means 126 may be a friction clasp. In some embodiments, the first adjusting means 126 may be a clamp-type clasp.

The one or more thigh straps 130 are configured to be wrapped around a thigh portion of a vehicle occupant. In the illustrated embodiment, the one or more thigh straps 130 are configured to be worn around both thighs of a vehicle occupant. The one or more thigh straps 130 each define a second accommodating space 132 configured to receive a thigh of a vehicle occupant. By virtue of the second accommodating space 132, the one or more thigh straps 130 can be wrapped around the thighs of the vehicle occupant.

In some embodiments, the second accommodating space 132 is adjustable so as to accommodate vehicle occupants of different body shapes and sizes, such as thighs of children as well as adults. The one or more thigh straps 130 may comprise second adjusting means 134 configured to adjust the second accommodating space 132. In some embodiments, the second adjusting means 134 may be a friction clasp. In some embodiments, the second adjusting means 134 may be a clamp-type clasp.

In some embodiments, the second adjusting means 134 may enable the one or more thigh straps 130 to be secured around the thigh portion of the vehicle occupant. The second adjusting means 134 may be configured to arrest movement of the one or more thigh straps 130 thereby securely fastening the one or more thigh straps 130 around thigh portions of a vehicle occupant. In some embodiments, a different mechanism may be provided for arresting movement of the one or more thigh straps 130.

In some embodiments, the safety harness device 100 comprises an adjustable central portion 140 enabling the safety harness device 100 to be worn by different vehicle occupants. For instance, the safety harness device 100 can be adjusted to fit a child as well as an adult. The safety harness device 100 comprises one or more height adjusting mechanisms 142 provided between the one or more torso straps 120 and the one or more thigh straps 130. By virtue of the height adjusting mechanisms 142, the one or more torso straps 120 and the one or more thigh straps 130 may be adjusted to be brought close to each other or displaced away from each other, thereby adjusting a height of the safety harness device 100.

The safety harness device 100 comprises at least one fastener 150 configured to fasten and secure the safety harness device 100 to a vehicle, thereby securing a vehicle occupant wearing the safety harness device 100 to the vehicle. In some embodiments, the at least fastener 150 may be provided with the one or more torso straps 120. In some embodiments, the at least fastener 150 may be provided with the one or more thigh straps 130. In some embodiments, the at least fastener 150 may be provided with both the one or more torso straps 120 and the one or more thigh straps 130.

The at least one fastener 150 is configured for detachably coupling to an attachment means of a vehicle, for instance, an attachment means provided at a back seat of the vehicle. It is appreciated that the at least one fastener 150 may detachably couple in an indirect manner via an attachment means separate from the vehicle. In some embodiments, the at least one fastener 150 may be in the form of a clip, a latch, a clasp, a buckle, and the like.

In some embodiments, the safety harness device 100 comprises two fasteners 150 configured to couple the safety harness device 100, and thus a vehicle occupant, to the vehicle at two attachment points. In some embodiments, the safety harness device 100 comprises more than two fasteners 150 configured to couple the safety harness device 100, and thus a vehicle occupant, to the vehicle at more than two attachment points.

Figure 3:
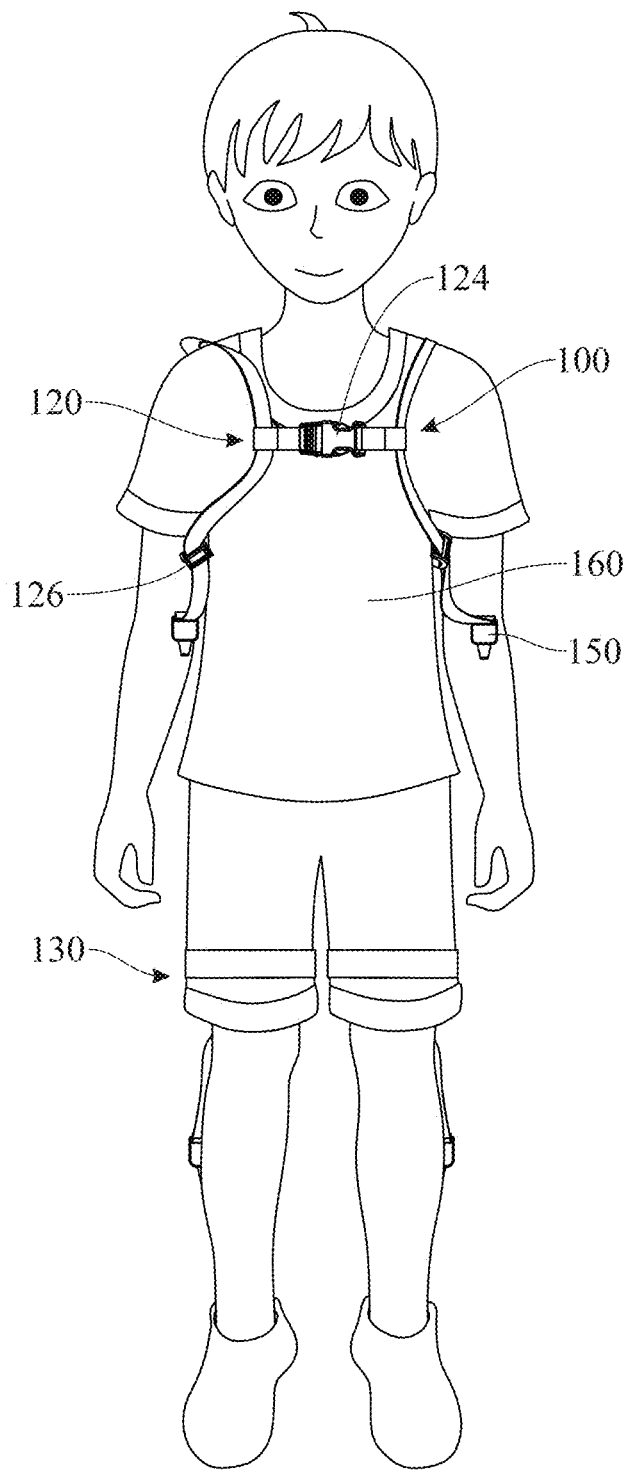
FIG. 3 illustrates a vehicle occupant wearing the safety harness device, the vehicle occupant being a child, in accordance with one embodiment of the present specification.
Figure 4:
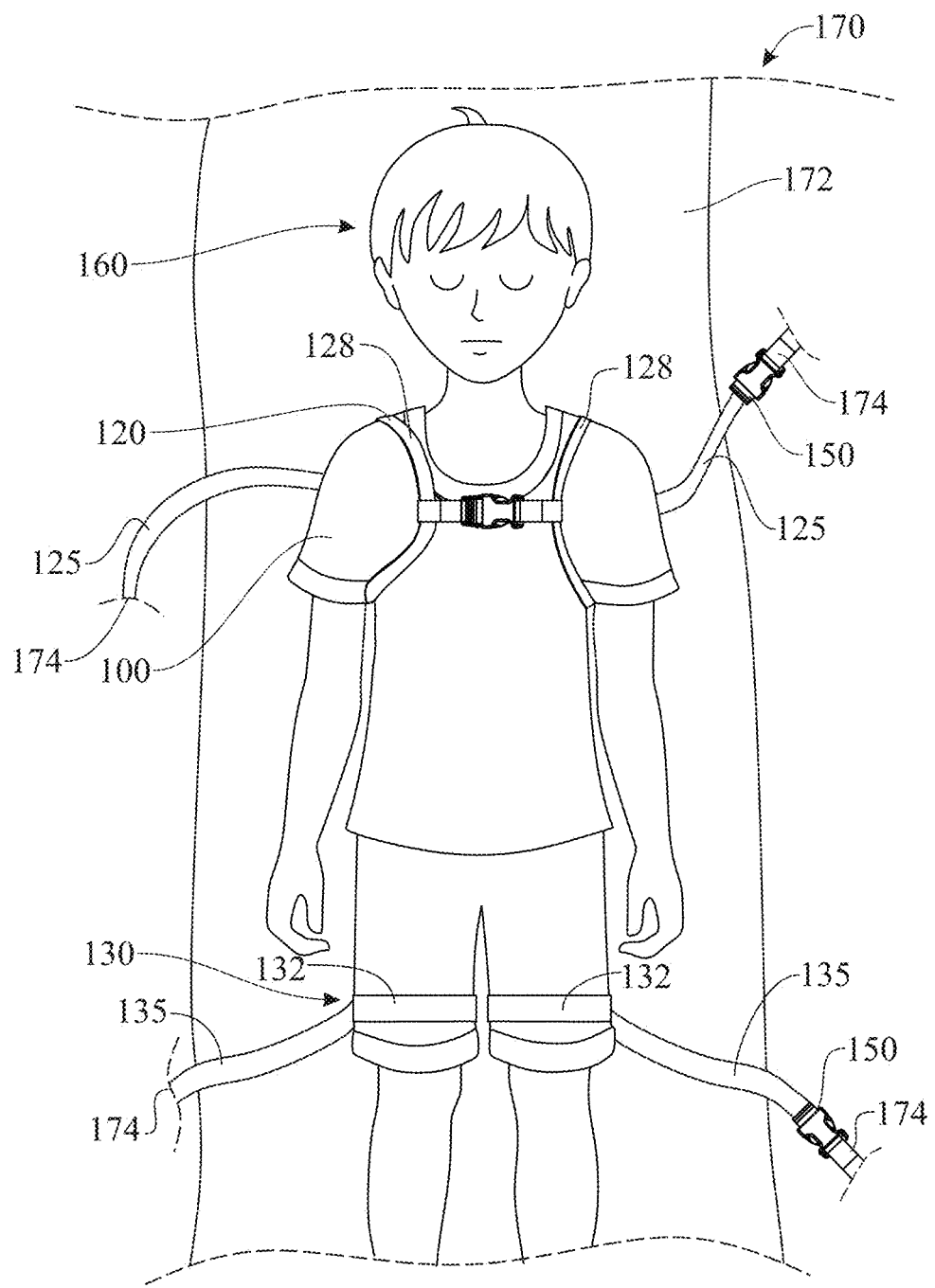
FIG. 4 illustrates a vehicle occupant wearing the safety harness device and laying on a back seat of a vehicle, in accordance with one embodiment of the present specification.

Reference is made to FIGS. 3-4 that illustrates the safety harness device 100 being worn by a vehicle occupant 160. FIG. 3 illustrates a vehicle occupant wearing the safety harness device 100, the vehicle occupant being a child, and FIG. 4 illustrates a vehicle occupant wearing the safety harness device 100 and laying on a back seat of a vehicle.

As can be seen in FIG. 3, the one or more torso straps 120 are worn by the vehicle occupant 160 around a torso, while the one or more thigh straps 130 are worn by the vehicle occupant 160 around the thighs. The safety harness device 100 is thus securely worn by the vehicle occupant 160.

As can be seen in FIG. 4, the vehicle occupant 160 lays down within a vehicle 170, in particular, on a back seat 172 of the vehicle 170. The fasteners 150 of the safety harness device 100 are detachably coupled to attachment means 174 of the vehicle 170. In some embodiments, the attachment means 174 may be a seat belt buckle of the vehicle 170. In some embodiments, the attachment means 174 may be a child seat anchor that is provided within the vehicle to secure the child seat within the vehicle.

In the illustrated embodiment, the safety harness device 100 is coupled to the vehicle at two attachment points via the attachment means 174. It is appreciated that the attachment points may not be limited to two.

As shown in FIG. 4, the safety harness device 100 can have a first of the at least two fasteners 150 coupled to the torso straps 120 by a torso fastener strap 125, preferably in a position configured to be either in front of (not shown) or behind the back of the occupant 160, and a second of the two fasteners 150 coupled to the thigh straps 130 by a thigh fastener strap 135, also either in the front of (not shown) or behind the leg of the occupant 160. Preferably the torso fastener strap 125 is coupled to the torso straps 120 in a perpendicular orientation thereto as would be the case in the situation shown in FIG. 4. Also, preferably, the thigh fastener strap 135 is coupled to the thigh straps 130 in a parallel orientation thereto as would be the case in the situation shown in FIG. 4. The expression "perpendicular orientation" as used herein in relation to the torso fastener strap(s) 125 is understood to pertain to the point of contact between the torso straps, e.g., the vertical shoulder strap 128 behind the back of the occupant 160 and the torso fastener strap 125, e.g., by any means such as a buckle, thermos-welding or the like. The expression "parallel orientation" as used herein in relation to the thigh fastener strap(s) 135 is understood to pertain to the point of contact between the thigh straps, e.g., the thigh strap 132 behind the leg of the occupant 160 and the thigh fastener strap 135, e.g., by any means such as a buckle, thermos-welding or the like. Such can comprise straps 125 and 135 as shown in FIG. 4 which can be oriented on the left or right of the occupant 160 depending on the orientation of the body of the occupant 160 in relation to the rear of the vehicle. For example, FIG. 4 is understood to have the rear of the vehicle to the right of the occupant, although if the occupant changes orientation such that the head is at the bottom of the figure and the legs are at the top, the opposite straps 125/135 can be used to fasten to the attachment means 174.

In another embodiment, the device 100 can comprise four fasteners 150 wherein two of the fasteners 150 are each coupled to the torso straps 120 by separate torso fastener straps 125, and the other two of fasteners 150 are coupled to the thigh straps 130 by separate thigh fastener straps 135. While in FIG. 4, the right most straps 125 and 135 are shown fastened to fastening means 174 in a rear seat of a vehicle, the opposing left most straps 125 and 135 can also be fastened to non-shown attachment means 174 by other non-shown fasteners 150. Such attachment means on the left can be floor anchors and the like.

As the fasteners 150 are coupled to the attachment means 174 of the vehicle 170, the vehicle occupant 160 can comfortably lay down on the back seat, and at the same time, the vehicle occupant 160 is safely secured to the vehicle. The vehicle occupant 160 thus need to sit at all times in case of travel, rather, the safety harness device 100 enables the vehicle occupant 160 to lay down and be in a comfortable position.

The fasteners 150 secure the vehicle occupant 160 in a still, laying down position. The fasteners 150 thus prevent injury to the vehicle occupant 160 in case of accidents by preventing or minimizing motion of the vehicle occupant in case of accidents or sudden stops. The safety harness device 100 also reduces the risk of whiplash as the vehicle occupant can travel comfortably in a laying position and the neck of the vehicle occupant does not carry the whole weight of the head.

The safety harness device 100 thus provides comfort to the vehicle occupant 160 during travel, and at the same time, prevents injury. The use of the safety harness device 100 is not limited to a child, and the safety harness device 100 can be used by adults or persons with medical conditions, such as back and spine injuries, which face inconvenience in sitting down for extended periods of times.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A safety harness device configured for securing a vehicle occupant in position which is consisting of a lying flat in a laid on a back position in a rear bench seat of a vehicle, the safety harness device comprising:
   a plurality of interconnected straps configured to be worn by the vehicle occupant; and,
   at least two fasteners configured to be detachably coupled to different attachment means of the vehicle, thereby securing the safety harness device, and the vehicle occupant wearing the safety harness device, within the vehicle,
   wherein the plurality of interconnected straps comprises one or more torso straps configured to be worn around a torso of the vehicle occupant and which one or more torso straps define a first accommodating space configured to receive the torso of the vehicle occupant,
   wherein the plurality of interconnected straps further comprises one or more thigh straps configured to be worn around a thigh portion of the vehicle occupant, the one or more thigh straps defining a second accommodating space configured to receive the thigh portion of the vehicle occupant, and
   wherein a first of the at least two fasteners is coupled to the torso straps by a torso fastener strap, and a second of the two fasteners is coupled to the thigh straps by a thigh fastener strap and wherein each of the torso fastener strap and the thigh fastener strap are each configured to attach to a separate attachment means of a vehicle which are selected from the group consisting of a seat belt buckle and a car seat anchor of the vehicle.

2. The safety harness device of claim 1, where the torso fastener strap is coupled to the torso straps in a perpendicular orientation thereto.

3. The safety harness device of claim 1, wherein the thigh fastener strap is coupled to the thigh straps in a parallel orientation thereto.

4. The safety harness device of claim 1 comprising four fasteners wherein two of the fasteners are each coupled to the torso straps by separate torso fastener straps, and the other two of the fasteners are coupled to the thigh straps by separate thigh fastener straps.

5. The safety harness device of claim 4, wherein the two torso fastener straps are coupled to the torso straps each in a perpendicular orientation thereto, and the two thigh fastener straps are coupled to the thigh straps each in a parallel orientation thereto.

6. The safety harness device of claim 1, further comprising two separate height adjustment straps each of which extend beneath the first accommodating space and above the second accommodating space, and which two separate height adjustment straps each have a height adjustment mechanism thereon.

7. The safety harness device of claim 1 further comprising first adjusting means to adjust the first accommodating space, and second adjusting means for adjusting the second accommodating space.

8. The safety harness device of claim 1, further comprising a buckle at the one or more torso straps for securely wrapping around the torso of the vehicle occupant.

* * * * *